United States Patent
Hammerschmidt et al.

(10) Patent No.: US 11,255,699 B2
(45) Date of Patent: Feb. 22, 2022

(54) DETECTION OF A DISCRETE POSITIONAL RELATIONSHIP BETWEEN A MAGNETIC FIELD GENERATOR AND A MAGNETIC FIELD SENSOR ARRANGEMENT

(71) Applicant: Infineon Technologies AG, Neubiberg (DE)

(72) Inventors: Dirk Hammerschmidt, Finkenstein (AT); Robert Hermann, Voelkermarkt (AT)

(73) Assignee: Infineon Technologies AG

( * ) Notice: Subject to any disclaimer, the term of this patent is extended or adjusted under 35 U.S.C. 154(b) by 36 days.

(21) Appl. No.: 16/902,724

(22) Filed: Jun. 16, 2020

(65) Prior Publication Data

US 2020/0400462 A1 Dec. 24, 2020

(30) Foreign Application Priority Data

Jun. 21, 2019 (DE) .......................... 102019209035.4

(51) Int. Cl.
*G01D 5/14* (2006.01)
*G01D 5/16* (2006.01)

(52) U.S. Cl.
CPC .............. *G01D 5/145* (2013.01); *G01D 5/16* (2013.01)

(58) Field of Classification Search
CPC .......................... G01D 3/08; G01D 5/12–2525
See application file for complete search history.

(56) References Cited

U.S. PATENT DOCUMENTS

| | | | |
|---|---|---|---|
| 8,089,275 B2 | 1/2012 | Riedmüller | |
| 8,339,125 B2 | 12/2012 | Arakawa et al. | |
| 9,574,905 B2 | 2/2017 | Hirota et al. | |
| 2015/0081246 A1* | 3/2015 | Schaaf | G01D 5/145 702/150 |
| 2017/0328701 A1* | 11/2017 | Ausserlechner | G01D 5/145 |
| 2018/0087889 A1* | 3/2018 | Ausserlechner | G01B 7/30 |

FOREIGN PATENT DOCUMENTS

| | | |
|---|---|---|
| CN | 104220844 A | 12/2014 |
| CN | 104487807 A | 4/2015 |
| CN | 107449354 A | 12/2017 |
| CN | 104656043 B | 3/2018 |

(Continued)

*Primary Examiner* — Douglas X Rodriguez
*Assistant Examiner* — David B Frederiksen
(74) *Attorney, Agent, or Firm* — Design IP (57) ABSTRACT

By a relative movement between an arrangement of at least three magnetic field sensors and a magnetic field generator, different discrete positional relationships can be produced between the same. A first signal is calculated as a first linear combination using at least two of three sensor signals. It is checked whether the first signal uniquely indicates one of the different discrete positional relationships. If yes, it is determined that the arrangement is located in the one discrete positional relationship. If no, a second signal is calculated as a second linear combination using at least two of the three sensor signals, at least one of which differs from the sensor signals used in the calculation of the first signal, and at least the second signal is used to determine in which of the different discrete positional relationships the arrangement is located relative to the magnetic field generator.

25 Claims, 7 Drawing Sheets

(56) References Cited

FOREIGN PATENT DOCUMENTS

| | | |
|---|---|---|
| CN | 107869951 A | 4/2018 |
| CN | 108020150 A | 5/2018 |
| DE | 102008015698 A1 | 10/2009 |
| DE | 112008003786 T5 | 2/2011 |
| DE | 102014114679 A1 | 7/2015 |
| DE | 102016102929 A1 | 8/2016 |
| JP | 2017129431 A | 7/2017 |

* cited by examiner

DETECTION OF A DISCRETE POSITIONAL RELATIONSHIP BETWEEN A MAGNETIC FIELD GENERATOR AND A MAGNETIC FIELD SENSOR ARRANGEMENT

FIELD

The present disclosure relates to devices and methods for detecting a positional relation-ship between a magnetic field generator and a magnetic field sensor arrangement which comprises at least three magnetic field sensors. In particular, the present disclosure deals with such devices and methods that allow the determination of which of a multiplicity of discrete positional relationships the magnetic field sensor arrangement is located in.

BACKGROUND

Magnetic field sensors are used to measure magnetic fields. Examples of magnetic field sensors are Hall sensor devices, which deliver an output signal that is proportional to an applied magnetic field. Other examples of magnetic field sensors are sensors based on a magnetoresistive effect, such as AMR sensors (AMR=anisotropic magnetoresistive effect), GMR sensors (GMR=giant magnetoresistive effect), CMR sensors (CMR)=colossal magnetoresistive effect, or TMR sensors (TMR=magnetoresistive tunnel effect).

For safety-relevant applications, such as detecting the position of a gear lever, two independent sensors can be used, for example two discrete sensors which are arranged on a common carrier, or two sensor chips in the same housing. Such sensors are used for redundancy purposes, for example, to detect a failure of one of the sensors or to be able to fully or partially compensate for the same in combination with other indicators, such as self-test results. Such redundant sensors generally provide no stray field suppression, however, since they do not measure differentially.

In addition to these kinds of redundant sensors, special configurations, setups of sensors can be used in conjunction with specific magnetic circuits which are designed to generate local differential magnetic fields. Such special configurations can enable a stray field suppression. For example, such arrangements can be incremental speed sensors with an adjusted distance between Hall probes and magnet-wheel pitch.

SUMMARY

It would be desirable to have devices and methods that enable a simple and reliable detection of the discrete positional relationship from a multiplicity of discrete position relationships in which a magnetic field sensor arrangement and a magnetic field generator are located, and by the same means to bring about a reduction in the interference field sensitivity.

Examples of the present disclosure create device for detecting a positional relationship between a magnetic field generator and an arrangement of at least three magnetic field sensors, wherein by means of a relative movement between the arrangement and the magnetic field generator, different discrete positional relationships can be generated between the arrangement and the magnetic field generator, the at least three magnetic field sensors being configured to generate at least three sensor signals in response to a magnetic field generated by the magnetic field generator, and the device having a processing device which is configured to: calculate a first signal as a first linear combination using at least two of the three sensor signals; to check whether the first signal uniquely indicates one of the various discrete positional relationships; if the first signal uniquely indicates one of the various discrete positional relationships, to determine that the arrangement is located in the one discrete positional relation-ship relative to the magnetic field sensor; and if the first signal does not uniquely indicate one of the various discrete positional relationships, to calculate a second signal as a second linear combination using at least two of the three sensor signals, at least one of which differs from the sensor signals used in the calculation of the first signal, and to use at least the second signal in order to determine in which of the different discrete positional relationships the arrangement is located relative to the magnetic field generator. The linear combinations of the sensor signal are preferably configured in such a way that they exhibit a reduced sensitivity relative to stray fields in comparison to the magnetic field of the magnetic field generator.

Examples of the present disclosure create methods for detecting a positional relationship between a magnetic field generator and an arrangement of at least three magnetic field sensors, wherein by means of a relative movement between the arrangement and the magnetic field generator, different discrete positional relationships can be generated between the arrangement and the magnetic field generator, the at least three magnetic field sensors being configured to generate at least three sensor signals in response to a magnetic field generated by the magnetic field generator, having the following features:

calculating a first signal as a first linear combination using at least two of the three sensor signals, checking whether the first signal uniquely indicates one of the various discrete positional relationships, if the first signal uniquely indicates one of the different discrete positional relationships, determining that the arrangement is located in the one discrete positional relationship to the magnetic field sensor, if the first signal does not uniquely indicate one of the various discrete positional relationships, calculating a second signal as a second linear combination using at least two of the three sensor signals, at least one of which differs from the sensor signals used in the calculation of the first signal, and using at least the second signal in order to determine in which of the different discrete positional relationships the arrangement is located relative to the magnetic field generator.

Examples of this disclosure exploit the fact that by using a first linear combination, it may be possible to determine the discrete positional relationship in which the magnetic field generator and magnetic field sensor arrangement are located. If the first linear combination does not uniquely allow such a determination, then at least one second linear combination is calculated in order to be used in the determination. Examples of the present disclosure thus allow this to be determined with reduced effort, since if a first linear combination which may be insensitive to stray fields and stray field gradients allows a unique determination, other linear combinations do not need to be calculated. Other sensor signals or linear combinations can be used, however, to carry out a plausibility check.

BRIEF DESCRIPTION OF THE DRAWINGS

Examples of the disclosure are described with reference to the attached drawings. In the drawings.

DETAILED DESCRIPTION

In the following, examples of the present disclosure are described in detail using the attached drawings. It should be noted that identical elements or elements that have the same functionality can be labelled with identical or similar reference signs, and a repeated description of elements that are labelled with the same or similar reference signs is typically omitted. Descriptions of elements that have the same or similar reference signs are interchangeable. In the following description, many details are described in order to provide a more in-depth explanation of examples of the disclosure. However, it is obvious to persons skilled in the art that other examples can be implemented without these specific details. Features of the different examples described can be combined with one another, unless the features of a corresponding combination mutually exclude each other or such a combination is explicitly excluded.

Figure 1:
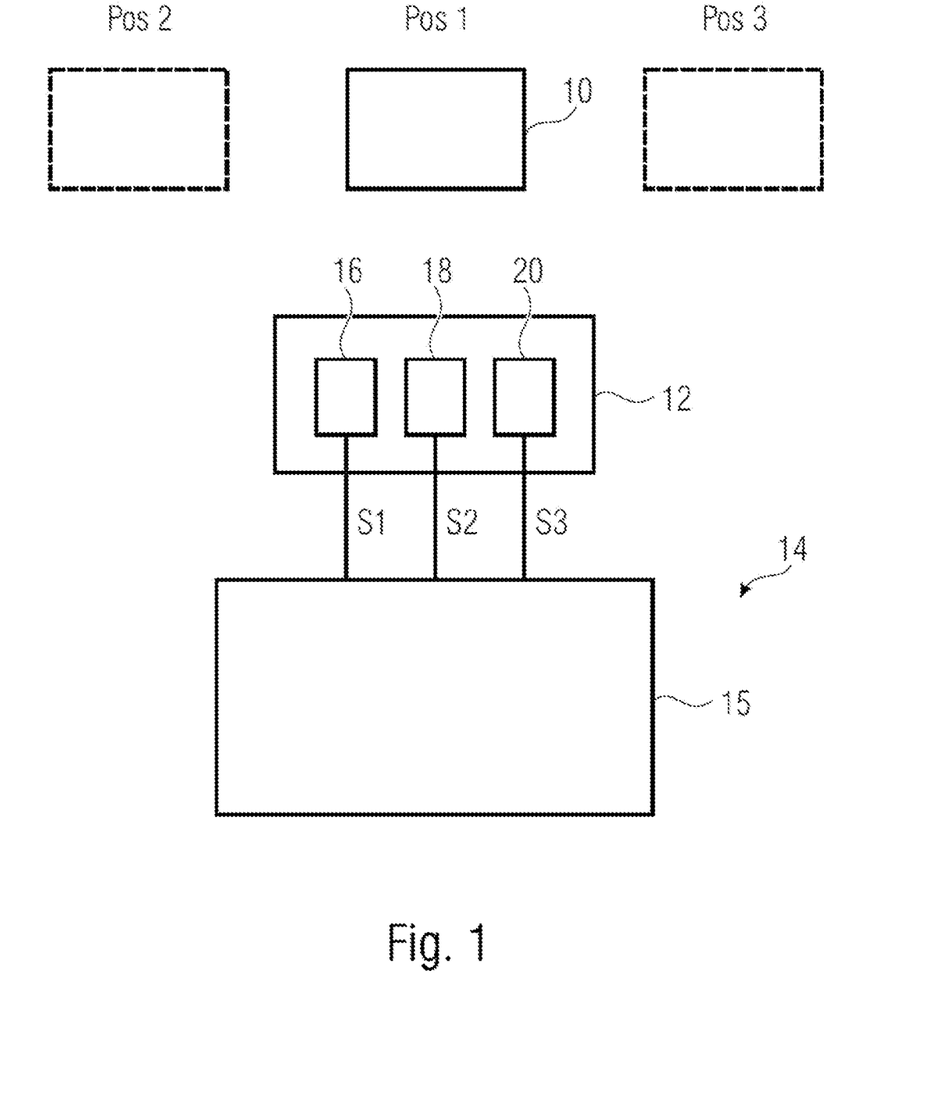
FIG. 1 shows a schematic drawing of a system that has a device in accordance with one example of the present disclosure.

FIG. 1 shows a schematic diagram of a system with a magnetic field generator 10, a magnetic field sensor arrangement 12 and a device 14 for determining a positional relationship between magnetic field 10 and magnetic field sensor arrangement 12. The device 14 has a processing circuit 15. Examples of the present disclosure relate to the device 14 with the processing circuit 15 without the magnetic field sensor arrangement 12 and the magnetic field generator 10. Examples of the present disclosure relate to a device or system, which is or are formed by a combination of the processing device 15 and the magnetic field sensor arrangement 12. Examples of the present disclosure relate to a device or a system, which is or are formed by a combination of the processing device 15, the magnetic field sensor arrangement 12 and the magnetic field generator 10.

The magnetic field sensor arrangement 12 has at least three magnetic field sensors 16, 18, 20. The magnetic field sensors 16, 18, 20 can be formed by any suitable sensor elements, such as, for example, Hall sensors or sensors based on a magnetoresistive effect, such as AMR sensors, GMR sensors, CMR sensors or TMR sensors. Each magnetic field sensor outputs a sensor signal to the device 14. In examples, each magnetic field sensor outputs a sensor signal which indicates a magnetic field component in one direction, such as $B_x$, $B_y$, or $B_z$.

In general, the magnetic field sensors of the magnetic field sensor arrangement have a stationary positional relationship to one another and can be arranged on a common carrier, for example, in a common housing or on the same chip.

The magnetic field sensor arrangement 12 is movable relative to the magnetic field generator 10. This allows different discrete positional relationships to be created between the arrangement 12 and the magnetic field generator 10. In FIG. 1, the magnetic field sensor arrangement 12 and the magnetic field generator 10 are shown in a first positional relationship Pos1. In addition, the magnetic field sensor is shown in dashed lines in a second positional relationship Pos2 and in a third positional relationship Pos3. In each of the positional relationships the magnetic field sensor arrangement 12 is arranged differently with respect to the magnetic field generated by the magnetic field generator, so that each positional relationship can be assigned a magnetic field region of a magnetic field in at least one direction. The at least three magnetic field sensors 16, 18, 20 are configured to generate at least three sensor signals S1, S2, S3 in response to the magnetic field generated by the magnetic field generator 10.

The device 14 receives the at least three sensor signals S1, S2, S3 and the processing device 15 calculates a first signal as a first linear combination using at least two of the three sensor signals S1, S2, S3. The processing device 15 also checks whether the first signal uniquely indicates one of the different discrete positional relationships Pos1, Pos2 or Pos3, for example the positional relationship Pos1 shown in FIG. 1. If the first signal uniquely indicates one of the different discrete positional relationships, such as Pos1, the processing circuit 15 verifies that the arrangement 12 is located in this discrete positional relationship to the magnetic field generator 10. Further calculations are not required in this case. If the first signal does not uniquely indicate one of the different discrete positional relationships, the processing circuit 15 calculates a second signal as a second linear combination using at least two of the three sensor signals S1, S2, S3, at least one of which differs from the sensor signals used in the calculation of the first signal, and uses at least the second signal in order to determine in which of the different discrete positional relationships the arrangement 12 is located relative to the magnetic field generator 10.

Figure 2:
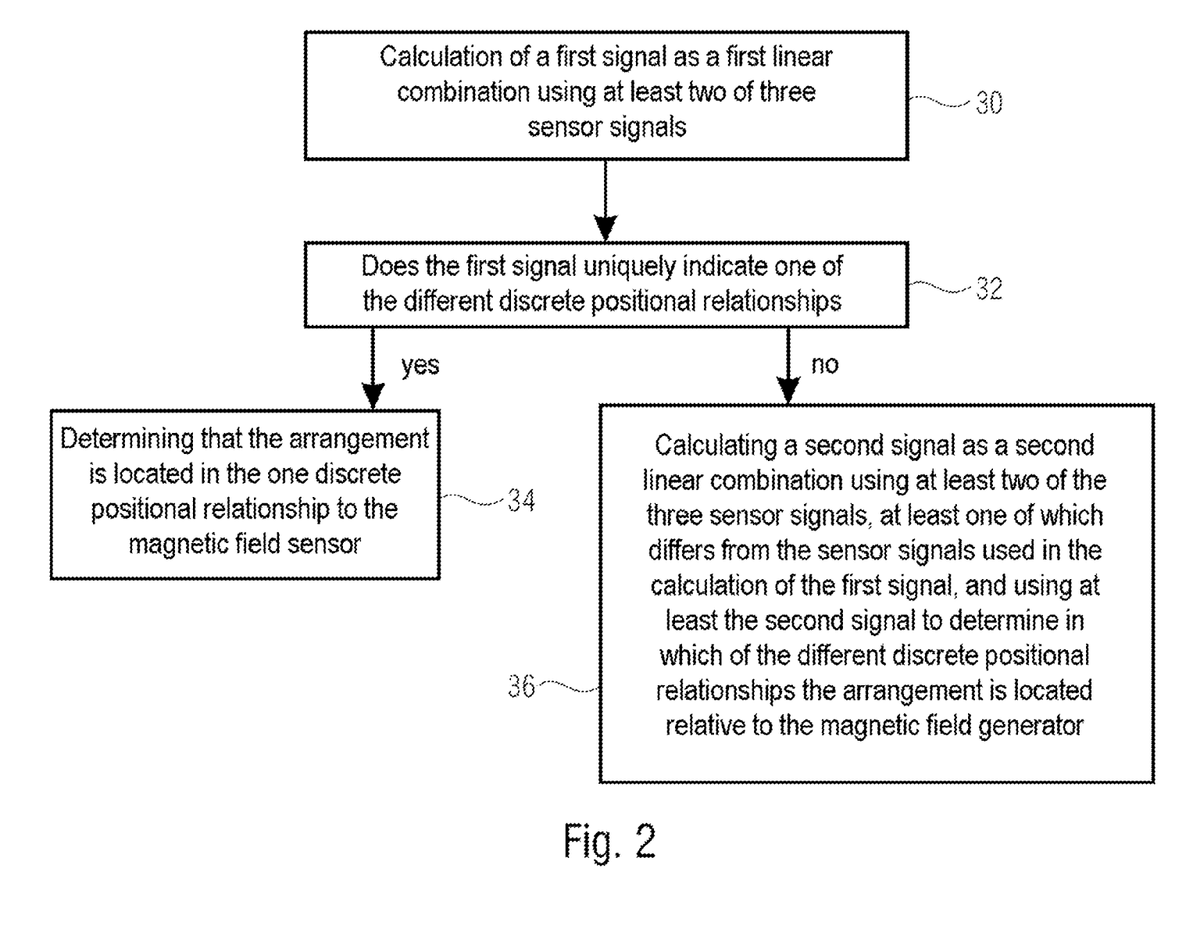
FIG. 2 shows a flow diagram of a method in accordance with one example of the present disclosure.

In some examples, the device 14 is thus configured to carry out a method as is shown in FIG. 2. At 30 the first signal is calculated as a first linear combination using at least two of the three sensor signals. At 32 it is checked whether the first signal uniquely indicates one of the different discrete positional relationships. If the result of the check at 32 is yes, at 34 it is determined that the arrangement is located in the discrete positional relationship to the magnetic field sensor. If the result of the check at 32 is no, at 36 a second signal is calculated as a second linear combination using at least two of the three sensor signals, at least one of which differs from the sensor signals used in the calculation of the first signal. At least the second signal is used to determine in which of the different discrete positional relationships the arrangement is located relative to the magnetic field generator.

In some examples, for example n discrete positional relationships can exist, where n is an integer greater than two. In some examples, the first linear combination can be designed to allow a unique determination of all n discrete positional relationships when there is no stray field present.

In other examples, the first linear combination can be designed to produce a unique determination if one of a first subset of the n discrete positional relationship exists, and not to produce a unique determination if a positional relationship exists which does not belong to the first subset. The second linear combination can be designed so as to produce a unique determination if a positional relationship exists which belongs to a second subset of the n positional relationships which contains different positional relationships from the first subset. The first and the second subset can include all n discrete positional relationships. In other examples, the first and the second subset do not contain all n discrete positional relationships, but at least one additional subset that contains one or more positional relationships which can be uniquely identified by one or more additional linear combinations. In such examples the processing device can be designed to calculate one or more linear combinations if the first and second linear combination do not allow a unique determination.

In some examples, the magnetic field sensors are sensitive in a specific direction. In some examples therefore, the magnetic field sensors are simple linear magnetic field sensors. In some examples, the magnetic field sensors are part of 1D sensor units, 2D sensor units or 3D sensor units. A 1D sensor unit has a magnetic field sensor which is sensitive in one direction in order to detect a first magnetic field component, e.g. $B_x$, $B_y$ or $B_z$. A 2D sensor unit has two magnetic field sensors which are sensitive in different directions, in order to detect a first and a second magnetic field component. A 3D sensor unit has three magnetic field sensors which are sensitive in three different directions, in order to detect three magnetic field components, e.g. $B_x$, $B_y$ and $B_z$.

In some examples, the magnetic field sensors 16, 18, 20 can be sensitive in the same direction, so that the sensor signals S1, S2, S3 indicate magnetic field components in the same direction. In some examples, the three magnetic field sensors 16, 18, 20 can be arranged side by side, wherein a second magnetic field sensor 18 of the three magnetic field sensors 16, 18, 20 is arranged between a first magnetic field sensor 16 and a third magnetic field sensor of the three magnetic field sensors 16, 18, 20. In examples, the processing circuit 15 can be designed to calculate the first signal in accordance with S1−2*S2+S3, and the second signal as a difference between the sensor signals S1 and S2, as a difference between the sensor signals S2 and S3, or as a difference between the sensor signals S1 and S3.

Examples of the present disclosure are not limited to a number of three magnetic field sensors. In some examples, the magnetic field sensor arrangement 12 can have heterogeneous combinations of magnetic field sensors in order to prevent systematic multiple failures. A plurality of arrangements can be used at different positions, which can be housed as discrete elements or can be installed in the same housing or on the same chip.

Magnetic field sensors of the magnetic field sensor arrangement which are designed to detect magnetic fields in different directions can be arranged at essentially the same position. Magnetic field sensors of the magnetic field sensor arrangement which are designed to detect magnetic fields in the same direction are arranged at a sufficient distance from one another in order to be placed in the magnetic field in such a way that the magnetic field produces a sufficient difference to be able to identify discrete positions and to be able to achieve a stray field compensation.

In some examples the magnetic field generator is designed to produce a magnetic field in as simple a way as possible.

In examples, the magnetic field sensor can be a bar magnet with only two poles or a magnetic disc. Thus, the magnetic field sensor can be implemented cost-effectively. The magnetic field sensor can be mounted on a moving part, the position of which is to be detected. In some examples, therefore, no complex magnetic circuit needs to be discarded in order to deliver a real, differential magnetic field.

Each discrete position, i.e. positional relationship, can be assigned a magnetic field region, wherein for at least one direction component the difference of the sensor signals of two spaced apart magnetic field sensors can be used. The observable influence of stray fields which are generated by a stray field source at a distance that is greater than the distance from the magnetic field generator, can be significantly reduced in this direction. Compared with magnetic circuits which are optimized for generating differential fields, the stray field cancellation is not perfect, which can be compensated for by a combination of different measurements. In some examples of the present disclosure therefore, one or more other linear combinations of sensor signals can be used, if a first calculated linear combination does not allow a unique determination.

In some examples of the present disclosure the processing device is designed to calculate the first linear combination using sensor signals of the at least three sensor signals which among all of the at least three sensor signals are the least sensitive to a particular stray field. In some examples, the positions of the magnetic field sensors and the combination of the measurements, i.e. the calculations of the first linear combination, the second linear combination and further possible linear combinations, can be selected in such a way that the positions, i.e., positional relations, which are detectable by means of the minimum signal differences can be detected by measurements with the best stray field suppression. For additional measurements which distinguish the other positions by greater magnetic field changes, measurements with higher stray field sensitivity can also be used.

In some examples of the present disclosure the magnetic field sensor arrangement is configured, i.e. the magnetic field sensors are placed, so as to provide significantly different signals for different discrete positional relationships that are to be detected. In such examples, the magnetic field sensors are arranged at appropriate distances from each other. This is true at least for the direction in which a stray field of a critical size is expected. The magnetic field sensors can be kept sufficiently close to each other to prevent gradients produced by stray fields from entering an area which affects the position detection. In some examples, the magnetic field measurements, i.e. the sensor signals, from each magnetic field sensor can be detected independently and differences between the signals of different sensor positions can be calculated (as linear combinations). The actual position can be classified based on a first calculated difference. If the first calculated difference does not uniquely identify the position, i.e. the positional relationship, one or more further differences can be calculated and used in order to distinguish positions which cannot be unambiguously identified based on the setup with the best stray field insensitivity. In some examples, additional cross-checks can be performed by using additional measurements or using sensor signals that represent other direction components of the magnetic field.

In some examples of the present disclosure, the three sensor signals can originate from a 3D sensor unit that has three magnetic field sensors which are designed to detect magnetic field components in different directions.

In some examples of the disclosure, the magnetic field sensor arrangement can have 1D, 2D or 3D sensor units that are spaced apart from each other, such that linear combinations, such as difference signals, of respective magnetic field sensors of the sensor units that detect magnetic field components in the same direction can be formed. Depending on the complexity of a position detection problem, 1D, 2D or 3D sensor units can be used.

In some examples, in addition to the linear combinations of the magnetic field sensors required for determining the position, other linear combinations can be used, which can be used for plausibility checking to improve the functional safety of the arrangement.

Figure 3:
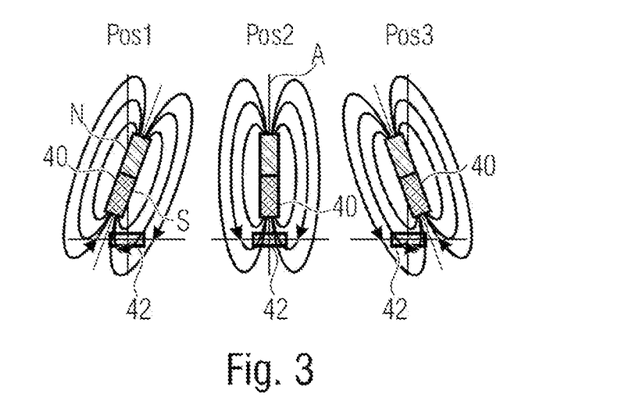
FIG. 3 and FIG. 4 show schematic drawings illustrating the positional relationships between a magnet and magnetic field sensors, which are helpful in explaining the present disclosure.

Referring to FIG. 3, a simple detection problem is described. This case involves the rotation of a permanent bar magnet 40, which represents a magnetic field generator, about its center which lies on a vertical axis A. The bar magnet 40 has a single north pole N and a single south pole S. Field lines of the magnetic field generated by the magnet 40 are shown in FIG. 3 (and FIGS. 4 and 5).

FIG. 3 shows three positional relationships Pos1, Pos2 and Pos3 of the permanent magnet 40 relative to a sensor unit 42. For example, the magnet 40 can be mounted on a movable lever, such as a gear shift. The gear shift and hence the magnet 40 can be positioned at the three discrete positions, which are shown in FIG. 3. In a non-safety-relevant application, the discrete position could be determined using a single sensor which detects the horizontal magnetic field component. The sensor could classify the position as follows:

Pos1: horizontal field points to the left
Pos2: horizontal field is close to 0
Pos3: horizontal field points to the right For the setup shown, the vertical magnetic field component cannot be used because the measurement results from Pos1 and Pos3 are both close to 0 and would therefore be ambiguous.

For applications that are safety-relevant, the sensor unit 42 could be doubled and the consistency of both measurements could be compared in order to determine whether an inconsistency exists. For a position sensing task with higher complexity, for example, the detection of the position of a gear shift, 2D or 3D magnetic field sensor units can be used and criteria can be defined for each dimension, for example, each magnetic field component $B_x$, $B_y$ and $B_z$, to obtain a better differentiation between multiple positions which are to be detected. Unfortunately, the detection may be distorted by an overlaid stray field, which in the worst case can be strong enough to turn the measurement by each sensor unit in a specific direction, for example a horizontal direction, which would always give rise to the same position detection regardless of the orientation of the magnet.

Figure 4:
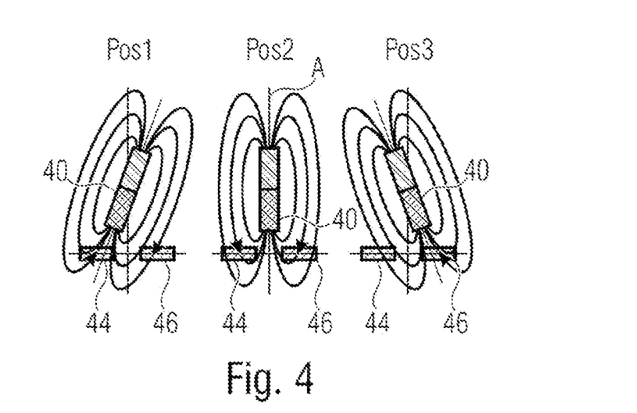

FIG. 4 shows a magnetic sensor arrangement which has two sensor units 44 and 46 that are spaced apart from each other. The magnet 40 is positioned in three positional relationships Pos1, Pos2 and Pos3 relative to the magnetic sensor in turn. As is apparent in position Pos2, the two sensor units 44 and 46 are arranged on opposite sides of the vertical axis A when the magnet is arranged in its central position (Pos2) with respect to the sensor units 44 and 46.

The sensor units 44, 46 can be, for example, 2D sensor units or 3D sensor units, which have magnetic field sensors that are capable of detecting a horizontal magnetic field component $B_x$ (x-direction) and a vertical magnetic field component $B_y$ (y-direction). The use of the difference between the output signals from magnetic field sensors of the sensor units 44, 46, which each detect equal magnetic field components, can be used to reduce a stray field distortion to the stray field gradient over the distance between the two magnetic field sensors. This represents a significant improvement over a case in which no stray field compensation takes place.

Considering the vertical magnetic field components in the example shown in FIG. 4, forming a difference between the sensor signal of the magnetic field sensor of the left-hand sensor unit 44 and the sensor signal of the magnetic field sensor of the right-hand sensor unit 46 yields the following results:

Pos1: (high vertical field)−(low vertical field)→positive difference
Pos2: (medium vertical field)−(medium vertical field)→difference close to 0
Pos3: (low vertical field)−(high vertical field)→negative difference The difference calculation represents a linear combination of the sensor signals of the left-hand sensor unit 44 and the right-hand sensor unit 46. A discrete positional relationship can be assigned to each of the results, wherein a positive difference uniquely indicates the position Pos1, a difference which is close to zero uniquely indicates the position Pos2, and a difference which is negative uniquely indicates the position Pos3.

For the setup shown in FIG. 4, the horizontal field components (x-direction) are not usable, because forming the difference of the measurements for the positions Pos1 and Pos3 would produce essentially identical results, so that due to the ambiguity, a unique assignment to one of the discrete positions would not be possible. The measurement of the horizontal field components could still be used, however, to verify that the magnet 40 is located in the position Pos2, since the difference for position Pos2 differs unambiguously from the differences of the positions Pos1 and Pos3. Thus, this difference obtained using the horizontal field components can provide a redundancy and be used as a plausibility check for determining the position Pos2 which was obtained using the vertical field components. Alternatively, preferably in particular, if lower stray fields are to be expected in the horizontal direction than in the vertical direction, the difference between the horizontal field components can be calculated first, which gives rise to a unique result when the magnet is located in position P2. If the magnet is not located in position P2 this calculation does not provide a unique result and the difference between the vertical field components is calculated in order to determine the discrete position uniquely. In this case the tolerable signal-to-noise ratio is higher than for vertical stray fields, since the position P2 has already been excluded by the measurement of the horizontal field difference.

Figure 6:
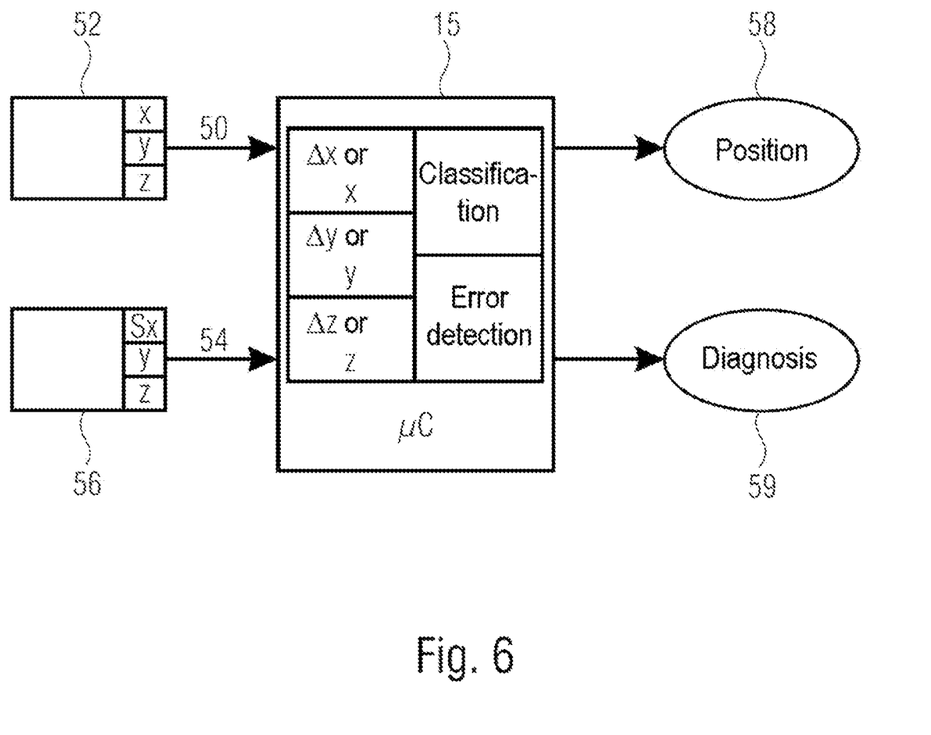
FIG. 6 shows a schematic representation of a system illustrating a device in accordance with examples, which uses signals from 3D sensor units.

FIG. 6 shows an example of a processing device 15, which receives sensor signals 50 from a first sensor unit 52 and sensor signals 54 from a second sensor unit 56. In the example shown, the sensor units 52 are 3D sensor units which detect sensor signals x, y, and z, the respective magnetic field components in the x-direction, y-direction and z-direction. The sensor signals 50 and 54 therefore each have 3 sensor signals x, y, and z. In some examples, the x-direction, the y-direction and the z-direction can be perpendicular to each other and correspond to the three directions of a Cartesian coordinate system. The processing device 15, which can be designed, for example, as a microcontroller, receives the sensor signals 50 and 54 from which it calculates respective difference signals Δx, Δy and Δz. The processing device 15 uses the sensor signals x, y, z, and/or the difference signals Δx, Δy and Δz, in order to classify the sensor signals and/or the difference signals to use them as a basis for determining the discrete positional relationship between the magnetic field sensor arrangement, which comprises the sensor units 52 and 54, and a magnetic field sensor (not shown in FIG. 6) and to output a position signal 58 that indicates the position. The processing device may also use one or more of the sensor signals x, y, z, and/or the difference signals Δx, Δy and Δz to perform an error detection, and based thereon to output a diagnostic signal 59, which can indicate, for example, that a sensor unit or a magnetic field sensor is not working properly.

Figure 7:
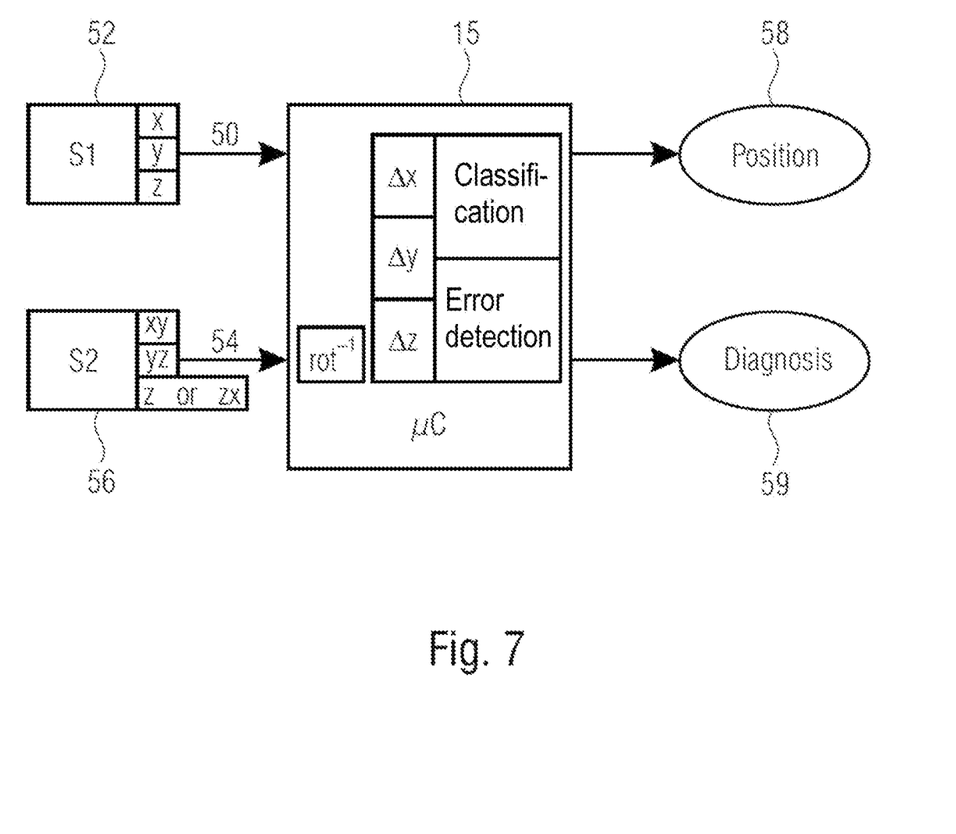
FIG. 7 shows a schematic representation of a system illustrating a device in accordance with examples, which uses signals from 3D sensor units in which at least one sensor is turned through an offset angle.

In order to diversify the classification, in some examples the sensor units can be offset with respect to one another about one, two or three axes by an offset angle. The magnetic field sensors of the mutually offset sensor units then no longer detect magnetic field components in the same direction, but magnetic field components that are arranged relative to one another at an angle corresponding to the offset angle. In order nevertheless to obtain stray field compensation or stray field reduction, in some examples of the present disclosure the sensor signals that are rotated about the offset angle are rotated back through the offset angle during the signal processing. FIG. 7 shows an example of the present disclosure in which the sensor unit 56 is rotated with respect to the sensor unit 52 by an offset angle, so that the three magnetic field sensors of the sensor unit 56 detect magnetic field components in the xy-direction, yz-direction and z- or zx-direction, as shown in FIG. 7. In the signal processing in the processing device 15 a conversion of the sensor signals then takes place, in order to compensate for the rotating of the sensor units 52 and 56 relative to each other, as indicated by a block rot$^{-1}$ in FIG. 7. In other words, the sensor signals of the two sensor units 44 and 46 are rotated into the same coordinate system.

In some examples of the present disclosure a magnetic field sensor arrangement can have, for example, the two sensor units 44 and 46 shown in FIG. 4, which each have at least two magnetic field sensors to detect the magnetic fields in at least two different directions. The processing device can then be designed to calculate a first linear combination, for example, a difference formation, between the sensor signals of the magnetic field sensors of the two magnetic field sensor arrangements 44 and 46, which detect magnetic field components in the same first direction. If the first linear combination does not uniquely indicate a discrete positional relationship between the magnet and the magnetic field sensor arrangement, then the processing device can be designed to calculate a second linear combination, for example, a difference formation, between the sensor signals of the magnetic field sensors of the two magnetic field sensor arrangements 44 and 46, which detect magnetic field components in a second direction different from the first direction, and to infer the position determination based on the result of the second linear combination.

In some examples of the present disclosure, the magnetic field sensor arrangement has additional sensors, wherein the processing device can be designed to calculate further linear combinations, such as differences between sensor signals, in order to implement additional safety mechanisms.

Figure 5:
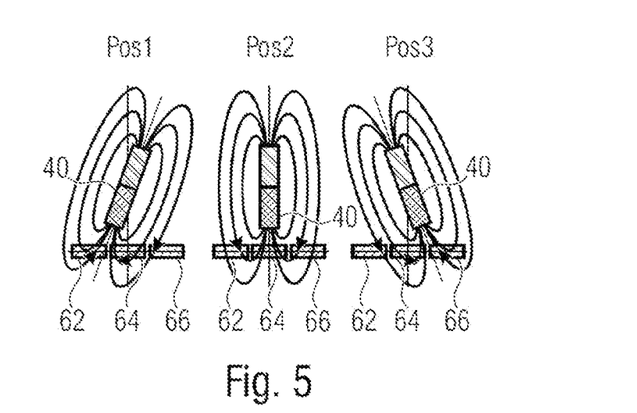
FIG. 5 shows a schematic drawing illustrating the positional relationship between a magnetic field arrangement and a magnet in accordance with an example of the present disclosure.

FIG. 5 shows an example of the present disclosure, in which the sensor arrangement has three sensor units 62, 64, 66. Each of the sensor units can be a 1D sensor unit, a 2D sensor unit or a 3D sensor unit. In some examples, each of the sensor units has at least one magnetic field sensor which is sensitive in a specific direction, so that the magnetic field sensors each detect magnetic field components in the same direction. It is assumed that the sensor units 62, 64, 66 each have magnetic field sensors that are designed to detect a magnetic field component which is vertical (y-direction) in the drawing. The corresponding magnetic field sensors are arranged side by side, the magnetic field sensor of the sensor unit 64 being arranged between the magnetic field sensors of the sensor units 62 and 66. In examples in which the sensor units are 1D sensor units, these have no additional magnetic field sensors. In examples in which the sensor units are 2D sensor units or 3D sensor units, they can have additional magnetic field sensors, which are sensitive in the x-direction and/or z-direction.

FIG. 5 shows the magnet 4 in the 3 positions Pos1, Pos2 and Pos3 in turn. The sensor signals of the magnetic field sensors of the sensor units 62, 64, 66, which detect the vertical magnetic field components, are assumed to be the first sensor signal S1 (sensor unit 62), the second sensor signal S2 (sensor unit 64), and the third sensor signal S3 (sensor unit 66).

For these sensor signals different linear combinations can be calculated, which produce the results set out below for the respective position Pos1, Pos2 and Pos3. Here, "high" stands in each case for a high value of the respective sensor signal, "low" for a low value of the respective sensor signal and "medium" for a mid-range value of the respective sensor signal.

Linear Combination S1-S3
Pos1: high−(−low)>0
Pos2: (−medium)−(−medium)=0
Pos3: (−low)−high<0
Linear Combination S1-S2
Pos1: high−0>0
Pos2: (−medium)−high<0
Pos3: (−low)−0<0
Linear Combination S2-S3
Pos1: 0−(−low)>0
Pos2: high−(−medium)>0
Pos3: 0−high<0
Linear Combination S1−2*S2+S3
Pos1: high−2*0+(−low)>0
Pos2: (−medium)−2*high+(−medium)<0
Pos3: (−low)−2*0+high<0

In general, all three possible differences that are calculated from any given pair of electrodes can be used to determine the magnet position. The respective results of the three differences for the different positions are located in different regions, so that the positions can be uniquely determined. The last linear combination S1−2*S2+S3, however, does not enable a distinction to be made between the positions Pos1 and Pos3. However, this linear combination is still very useful for detecting the central position Pos2, since compared with the outer positions Pos1 and Pos2 it has a different sign. All difference signals are insensitive to stray fields, but the evaluation signal obtained by the last linear combination is also insensitive to a stray field gradient. Therefore, the last linear combination, i.e. S1−2*S2+S3, can be used to determine the central magnetic position Pos2 uniquely if this linear combination yields a value <0. If this linear combination yields a value >0, then this evaluation signal does not uniquely indicate one of the different discrete positions Pos1, Pos2 and Pos3. In this case, the processing device will calculate a second evaluation signal using one of the other linear combinations, i.e. one of the differences S1−S3, S2−S3 and S1−S2, in order to determine the magnet position using the second evaluation signal. For example, the difference S1−S3 provides a good differentiation between the two outer positions and provides a stray field insensitivity. The linear combination S1−2*S2+S3 provides a perfect distinction between an outer position and the central position of the magnet and is insensitive to the stray field and its linear gradient. The two signals are redundant in diverse ways and allow cross-checks, which distinguish at least between the central position and the outer positions, which represents the distinction with the lower signal difference and is therefore the most important plausibility check.

In accordance with some examples of the present disclosure, the first linear combination can be one which enables the unambiguous identification of some, but certainly not all, of the discrete positional relationships. If a positional relationship exists which cannot be uniquely determined by means of the first linear combination, the second linear combination is used. The first linear combination can be one which is insensitive to stray fields and stray field gradients.

Examples of the present disclosure, however, are not limited to three sensor units or magnetic field sensors, but can be extended to a greater number of magnetic field sensors or sensor units with corresponding magnetic field sensors.

Figure 8:
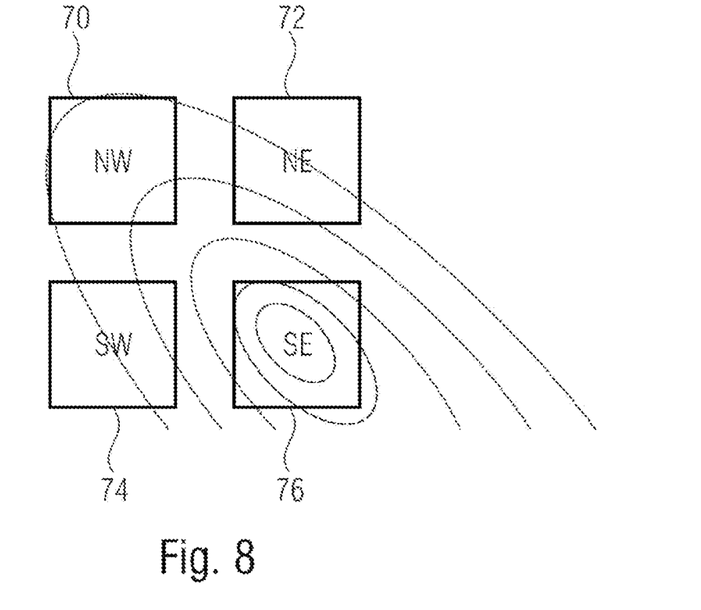
FIG. 8, FIG. 9 and FIG. 10 show schematic drawings which illustrate the different positional relationships between an arrangement with four magnetic field sensors and a magnetic field, in accordance with one example of the present disclosure.

In particular, an extension of the idea of the insensitivity to stray field gradients can be obtained by an arrangement of magnetic field sensors in a two-dimensional array. FIG. 8 schematically illustrates an arrangement of four magnetic field sensors 70, 72, 74, 76, which are arranged at the four corners of a rectangle or square, thus in a quadrupole arrangement. The magnetic field lines shown, ellipsoids, represent an estimate of the magnetic flux density for the vertical (perpendicular to the drawing plane) component of the magnetic field, which is illustrated by equipotential lines. In FIG. 8 a magnet (not shown), which generates a magnetic field with these field lines, is arranged above the magnetic field sensor 76. According to FIG. 9, the magnet is arranged between the sensors 74 and 76 and in accordance with FIG. 10, the magnet is arranged centrally over the sensor arrangement which has the magnetic field sensors 70 to 76. The magnetic field sensors 70 to 76 can, in turn, be part of a 1D sensor Unit, a 2D sensor unit or a 3D sensor unit and may be sensitive to magnetic field components in the same direction. The magnetic field sensor 70 supplies a sensor signal NW, the magnetic field sensor 72 supplies a sensor signal NE, the magnetic field sensor 74 supplies a sensor signal SW, and the magnetic field sensor 76 supplies a sensor signal SE.

Figure 9:
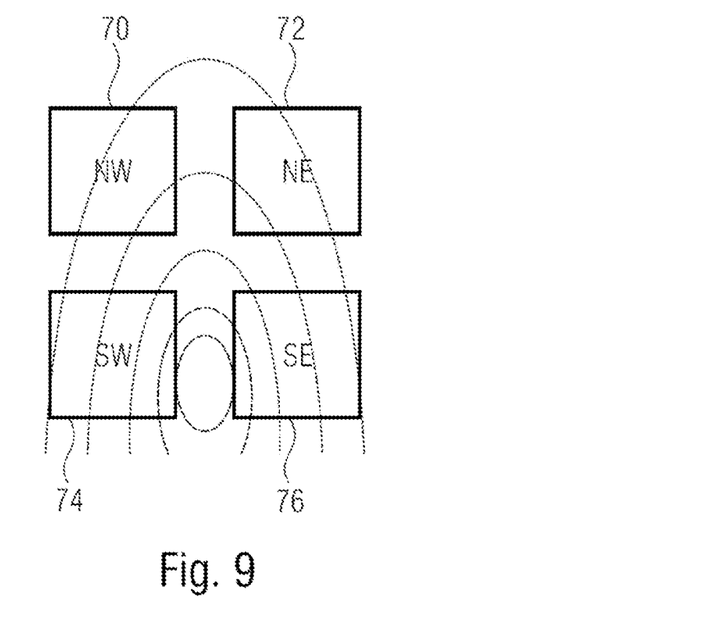
Figure 10:
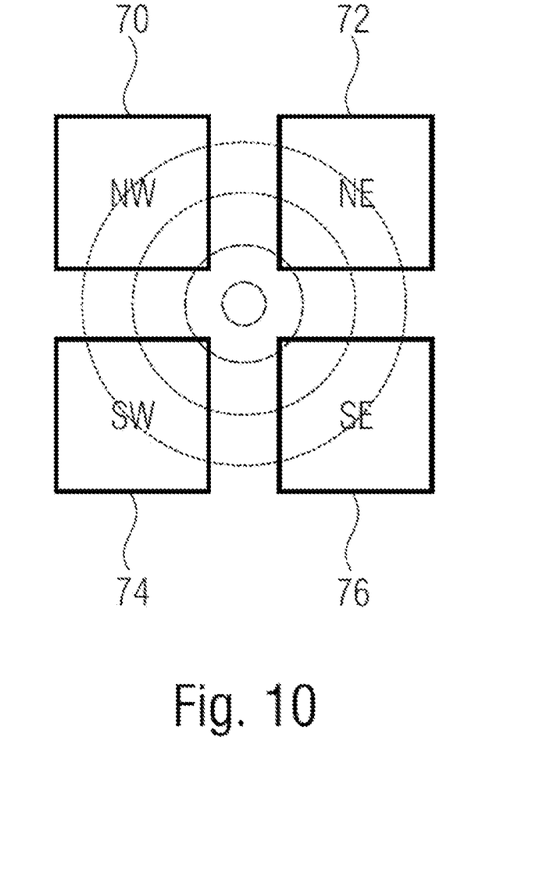

From the sensor signals NW, NE, SW, SE different linear combinations can be calculated which can be used to determine the discrete position in which the magnet is located. Differences between the sensor signals from any two of the magnetic field sensors are insensitive to homogeneous stray fields, but not to stray field gradients. Measurement of the magnetic field using the four spaced apart magnetic field sensors 70, 72, 74, 76 makes it possible to calculate three differences which can be used to identify at least nine positions inside the square of the positions of the four magnetic field sensors. Since a difference is not sufficient in order to determine a discrete positional relationship uniquely, a plurality of differences is therefore calculated, which taken together enable a unique determination of the discrete positional relationship of the sensor arrangement relative to the magnet.

In some examples of the present disclosure it is possible to calculate more than two linear combinations, in case even two linear combinations still do not indicate an ambiguous positional relationship. As described, for example, in the example shown in FIGS. 8 to 10, the combination of three different measurements can yield an unambiguous detection of at least nine positions in the grid between the four magnetic field sensors 70, 72, 74, 76. These positions can be, for example, top left, center left, bottom left, upper middle, center middle, bottom center, top right, right center, and bottom right.

In some examples, the first linear combination can be calculated by calculating the sums of respectively diametrically opposite magnetic field sensors of four magnetic field sensors and deducting them from each other. In the example shown in FIGS. 8 to 10, the first linear combination can be calculated, for example, as NW−NE−SW+SE. This combination is insensitive to homogeneous stray fields and first-order gradients. This calculation results in zero for all positions along the central cross between the four magnetic field sensors and thus does not allow a unique determination of the position when the magnet is located there. In such a case, one or more other linear combinations between the sensor signals NW, NE, SW and SE are additionally used to determine the discrete position at which the magnet is located. The other most suitable linear combinations can be selected such that they are insensitive to the direction of interference fields in which the highest strengths of the stray field are to be expected.

In examples of the present disclosure, each sensor signal of the at least three sensor signals indicates a magnetic field component in a particular direction, wherein the processing device is designed to calculate the first and second signal using at least two sensor signals that indicate magnetic field components in the same direction and originate from magnetic field sensors of the at least three magnetic field sensors which are arranged with a spatial distance between the same. The processing device in such examples can be designed to calculate the first and/or second linear combination as a difference between any two of the at least two sensor signals. In some examples, the processing device can be designed to calculate the first and/or second linear combination by using more than two sensor signals which indicate magnetic field components in the same direction and originate from magnetic field sensors which are spaced apart from each other.

In some examples, the magnetic field sensor arrangement can have a plurality of sensor units which are spaced from each other, wherein the sensor units can have a 1D sensor unit, a 2D sensor unit or a 3D sensor unit. The processing device can then be designed to use sensor signals of the sensor units in the calculation of the first, second, and optionally further linear combinations. The respective linear combination in this case can be calculated using sensor signals which indicate magnetic field components in the same direction.

Examples of the present disclosure thus allow a detection of discrete positions of a magnetic field generator relative to a magnetic field sensor arrangement, wherein the magnetic field sensor arrangement can have at least two discrete sensor units, which can provide a redundancy for functional safety and, at the same time, a reduction of a stray field sensitivity.

In some examples, the processing device and the magnetic field sensor arrangement are integrated in a device. In some examples the processing device can be provided as a separate device, separate from the magnetic field sensor arrangement, and receive the sensor signals from the magnetic field sensor arrangement. The processing device can be designed to output a signal that indicates the discrete position of the magnetic field sensor relative to the magnetic field sensor arrangement. In some examples, the processing device can be designed additionally to output a diagnostic signal, which is defined using the sensor signals and/or linear combinations calculated from the sensor signals.

In some examples, the processing device can be implemented by any suitable circuit structures, such as microprocessor circuits, ASIC circuits, CMOS circuits and the like. In some examples, the processing circuit can be implemented as a combination of hardware structures and machine-readable instructions. For example, the processing circuit can have a computing device, such as a processor, and storage devices, which store machine-readable instructions that give rise to the implementation of methods described herein when they are executed by the computing device. In some examples, the memory can be implemented by any suitable storage devices, such as EPROM, EEPROM, Flash-EEPROM, FRAM (ferroelectric RAM), MRAM (magnetoresistive RAM), or phase-change RAM. The memory can be coupled with the computing device or can be integrated in the computing device as part of the same. In some examples, the processing device and the magnetic field sensor arrangement can be integrated in a sensor module.

Depending on the specific implementation requirements, examples of the present disclosure can be implemented by means of any combination of circuits, hardware and/or machine-readable instructions. Examples of the device described herein can have a central processing unit, CPU, a microprocessor and/or any hardware device which is suitable for executing instructions stored on a machine-readable medium. Examples of the device can have a machine-readable medium, which stores machine-readable commands which effect the functionalities described herein, if they are executed by a processing device. The machine-readable medium can be implemented by any electronic, magnetic, optical or other physical storage medium, such as EPROM, EEPROM, Flash-EEPROM, FRAM (ferroelectric RAM), MRAM (magnetoresistive RAM), or phase-change RAM. Examples of the present disclosure relate to machine-readable instructions which, if they are executed by a processing device, cause the processing device to effect the functionalities as they are described herein.

Although a number of aspects of this disclosure have been described as features in connection with a device, it is clear that such a description can also be regarded as a description of corresponding method features. Although some aspects have been described as features in connection with a method, it is clear that such a description can also be regarded as a description of corresponding features of a device or the functionality of a device.

In the foregoing detailed description, different features have sometimes been grouped together in examples in order to streamline the disclosure. This aspect of the disclosure should not be interpreted as intending that the claimed examples have more features than are expressly specified in each claim. Instead, as the following claims show, the subject matter may be present in fewer than all of the features disclosed in a single example. Consequently, the following claims are hereby incorporated into the detailed description, wherein each claim can stand as a separate example of its own. While each claim can stand as its own separate example, it should be noted that, although dependent claims in the claims refer back to a specific combination with one or more other claims, other examples also comprise a combination of dependent claims with the subject matter of any other dependent claim or a combination of each feature with other dependent or independent claims. Such combinations are assumed to be comprised, except where it is stated that a specific combination is not intended. It is also intended that a combination of features of a claim with any other independent claim is also included, even if this claim is not directly dependent on the independent claim.

The above-described examples are merely representative of the principles of the present disclosure. It is important to understand that modifications and variations of the arrangements and details that are described are obvious to persons skilled in the art. It is therefore intended that the disclosure is limited only by the attached claims and not by the specific details that are set out for the purpose of the description and explanation of the examples.

LIST OF REFERENCE SIGNS

10 magnetic field generator
12 magnetic field sensor arrangement
14 device for position detection
15 processing device
16, 18, 20 magnetic field sensors
S1, S2, S3 sensor signals
40 bar magnet
42, 44, 46 sensor units
50, 54 sensor signals
52, 56 sensor units
58 position signal
59 diagnostic signal
62, 64, 66 sensor units
70, 72, 74, 76 magnetic field sensors

What is claimed is:

1. A device, comprising:
an arrangement of at least three magnetic field sensors configured to generate at least three sensor signals in response to a magnetic field generated by a magnetic field generator; and
a processing device configured to detect a positional relationship between the magnetic field generator and the arrangement of the at least three magnetic field sensors, wherein by a relative movement between the arrangement and the magnetic field generator, different discrete positional relationships are generated between the arrangement and the magnetic field generator, wherein the processing device is configured to:
calculate a first signal as a first linear combination using a first sensor signal set comprising at least two of the at least three sensor signals,
determine whether the first signal uniquely indicates one of the different discrete positional relationships,
if the first signal uniquely indicates one of the different discrete positional relationships, determine that the arrangement is located in a first discrete positional relationship of the different discrete positional relationships to the magnetic field generator, and
if the first signal does not uniquely indicate one of the different discrete positional relationships, to calculate a second signal as a second linear combination using a second sensor signal set comprising at least two of the at least three sensor signals, at least one of which differs from the sensor signals used in the first sensor signal set for the calculation of the first signal, and to use at least the second signal in order to determine in which of the different discrete positional relationships the arrangement is located relative to the magnetic field generator.

2. The device as claimed in claim 1, wherein:
each sensor signal of the at least three sensor signals indicates a magnetic field component in a particular direction, wherein the processing device is configured to calculate the first signal and the second signal using at least two sensor signals that indicate magnetic field components in a same direction and originate from magnetic field sensors of the at least three magnetic field sensors, which are arranged with a spatial distance between the same.

3. The device as claimed in claim 1, wherein:
each sensor signal of the at least three sensor signals indicates a magnetic field component in a specific direction, wherein the processing device is configured to perform calculations in order to convert sensor signals which indicate magnetic field components in directions arranged at an angle to one another into converted sensor signals which indicate magnetic field components in a same direction.

4. The device as claimed in claim 3, wherein three converted sensor signals of the converted sensor signals indicate magnetic field components in the same direction.

5. The device as claimed in claim 1, wherein three sensor signals of the at least three sensor signals indicate magnetic field components in a same direction.

6. The device as claimed in claim 5, wherein:
the three sensor signals originate from three magnetic field sensors which are arranged next to one another, wherein a second magnetic field sensor of the three magnetic field sensors is arranged between a first magnetic field sensor and a third magnetic field sensor of the three magnetic field sensors, wherein the processing circuit is configured to:
calculate the first signal according to S1−2*S2+S3, where S1 is the sensor signal generated by the first magnetic field sensor, S2 is the sensor signal generated by the second magnetic field sensor and S3 is the sensor signal generated by the third magnetic field sensor, and
calculate the second signal as a difference between the sensor signals of the first magnetic field sensor and the second magnetic field sensor, as a difference between the sensor signals of the second magnetic field sensor and the third magnetic field sensor, or as a difference between the sensor signals of the first magnetic field sensor and the third magnetic field sensor.

7. The device as claimed in claim 5, wherein:
the arrangement of at least three magnetic field sensors includes at least four magnetic field sensors, and
four sensor signals of the at least three sensor signals originate from the at least four magnetic field sensors which are arranged in a square arrangement in a two-dimensional array,
wherein the processing device is configured to calculate the first signal by calculating sums of respectively diametrically opposite magnetic field sensors of the at least four magnetic field sensors and subtracting the sums from each other.

8. The device as claimed in claim 7, wherein:
the processing device is configured to calculate the second signal, a third signal, and a fourth signal as differences between different pairs of the four sensor signals and to use the second, the third, and the fourth signals to determine in which of the different discrete positional relationships the arrangement is located relative to the magnetic field sensor.

9. The device as claimed in claim 1, wherein:
the sensor signals of the at least three sensor signals originate from at least four magnetic field sensors, a first two of the at least four magnetic field sensors are arranged with a spatial distance between the same and are configured to detect a magnetic field component in a first direction, and a second two of the at least four magnetic field sensors are arranged with a spatial distance between the same and are configured to detect a magnetic field component in a second direction different from the first direction.

10. The device as claimed in claim 1, wherein:
the at least three sensor signals originate from at least one first magnetic field sensor which is configured to detect a magnetic field component in a first direction, originate from at least one second magnetic field sensor which is configured to detect a magnetic field component in a second direction different from the first direction, and originate from a third magnetic field sensor which is configured to detect a magnetic field component in a third direction different from the first and the second directions.

11. The device as claimed in claim 1, wherein:
the processing device is configured to calculate the first linear combination using sensor signals of the at least three sensor signals which have a lowest sensitivity to a particular stray field among all of the at least three sensor signals.

12. The device as claimed in claim 1, wherein:
the processing circuit is configured to use other sensor signals than the sensor signals that were used to calculate the first signal and the second signal in order to carry out a plausibility check.

13. The device as claimed in claim 1, wherein the magnetic field generator is formed by a magnet which has exactly one north pole and exactly one south pole.

14. A method for detecting a positional relationship between a magnetic field generator and an arrangement of at least three magnetic field sensors, wherein by means of a relative movement between the arrangement and the magnetic field generator, different discrete positional relationships are generated between the arrangement and the magnetic field generator, the at least three magnetic field sensors being configured to generate at least three sensor signals in response to a magnetic field generated by the magnetic field generator, the method comprising:
calculating a first signal as a first linear combination using a first sensor signal set comprising at least two of the at least three sensor signals,
determining whether the first signal uniquely indicates one of the different discrete positional relationships,
if the first signal uniquely indicates one of the different discrete positional relationships, determining that the arrangement is located in a first discrete positional relationship of the different discrete positional relationships to the magnetic field generator,
if the first signal does not uniquely indicate one of the different discrete positional relationships, calculating a second signal as a second linear combination using a second sensor signal set comprising at least two of the at least three sensor signals, at least one of which differs from the sensor signals used in the first sensor signal set for the calculation of the first signal, and using at least the second signal in order to determine in which of the different discrete positional relationships the arrangement is located relative to the magnetic field generator.

15. The method as claimed in claim 14, wherein each sensor signal of the at least three sensor signals indicates a magnetic field component in a particular direction, wherein the first signal and the second signal are calculated using at least two sensor signals which indicate magnetic field components in a same direction.

16. The method as claimed in claim 14, wherein each sensor signal of the at least three sensor signals indicates a magnetic field component in a specific direction, wherein calculations are performed in order to convert sensor signals, which indicate magnetic field components in directions arranged at an angle to one another, into converted sensor signals which indicate magnetic field components in a same direction.

17. The method as claimed in claim 16, wherein three converted sensor signals of the converted sensor signals indicate magnetic field components in the same direction.

18. The method as claimed claim 15, wherein three sensor signals of the at least three sensor signals indicate magnetic field components in the same direction.

19. The method as claimed in claim 18, wherein the three sensor signals originate from three magnetic field sensors which are arranged next to one another, wherein a second magnetic field sensor of the three magnetic field sensors is arranged between a first magnetic field sensor and a third magnetic field sensor of the three magnetic field sensors,
the first signal is calculated according to $S1-2*S2+S3$, where $S1$ is the sensor signal generated by the first magnetic field sensor, $S2$ is the sensor signal generated by the second magnetic field sensor and $S3$ is the sensor signal generated by the third magnetic field sensor, and
the second signal is calculated as a difference between the sensor signals of the first magnetic field sensor and the second magnetic field sensor, as a difference between the sensor signals of the second magnetic field sensor and the third magnetic field sensor, or as a difference between the sensor signals of the first magnetic field sensor and the third magnetic field sensor.

20. The method as claimed in claim 18, wherein:
four sensor signals of the at least three sensor signals originate from at least four magnetic field sensors which are arranged in a square arrangement in a two-dimensional array, and
the first signal is calculated by calculating sums of respectively diametrically opposite magnetic field sensors of the at least four magnetic field sensors and subtracting the sums from each other.

21. The method as claimed in claim 20, wherein:
the second signal, a third signal, and a fourth signal are calculated as differences between different pairs of the four sensor signals, and the second, the third, and the fourth signals are used to determine in which of the different discrete positional relationships the arrangement is located relative to the magnetic field sensor.

22. The method as claimed in claim 14, wherein:
the sensor signals of the at least three sensor signals originate from at least four magnetic field sensors, a first two of the at least four magnetic field sensors are arranged with a spatial distance between the same and are configured to detect a magnetic field component in a first direction, and a second two of the at least four magnetic field sensors are arranged with a spatial distance between the same and are configured to detect a magnetic field component in a second direction different from the first direction.

23. The method as claimed in claim 14, wherein:
the at least three sensor signals originate from at least one first magnetic field sensor which is configured to detect a magnetic field component in a first direction, originate from at least one second magnetic field sensor which is configured to detect a magnetic field component in a second direction different from the first direction, and originate from a third magnetic field sensor which is configured to detect a magnetic field component in a third direction different from the first and the second directions.

24. The method as claimed in claim 14, wherein the first linear combination is calculated using sensor signals of the at least three sensor signals which have a lowest sensitivity to a particular stray field among all of the at least three sensor signals.

25. The method as claimed in claim 14, wherein sensor signals other than the sensor signals used to calculate the first signal and the second signal are used to carry out a plausibility check.

* * * * *